April 4, 1939.  H. J. WEPPLO  2,153,444
CENTERING GAUGE
Filed Aug. 12, 1938
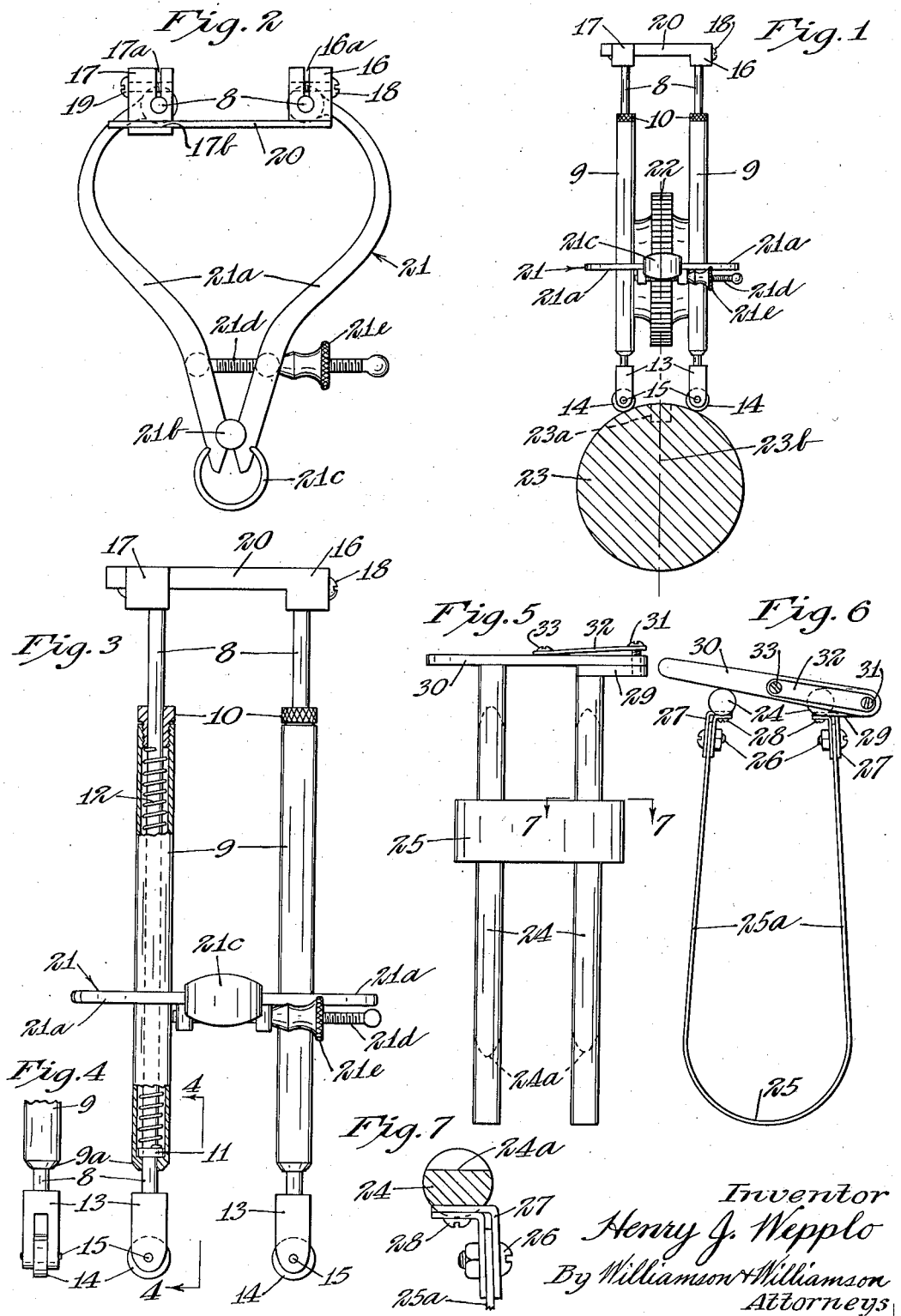
Inventor
Henry J. Wepplo
By Williamson & Williamson
Attorneys Patented Apr. 4, 1939

2,153,444

UNITED STATES PATENT OFFICE 2,153,444

CENTERING GAUGE

Henry J. Wepplo, Minneapolis, Minn.

Application August 12, 1938, Serial No. 224,473

12 Claims. (Cl. 33—185)

My invention relates to machinists' gauges and particularly to gauges for use in centering one mechanical element relative to another.

In use of a milling machine it is often necessary to center a cylindrical element, such as a shaft in which a keyway is to be cut or a gear blank in which gear teeth are to be formed, under the rotary cutter of the machine. The work is set up between centers and is held thereby with its rotational axis below and at right angles to the cutter shaft. Means is provided for adjustively moving the work in a direction parallel to the axis of the cutter shaft for purposes of vertically aligning the axis of the work with the central radial plane of the cutter.

It is an object of my invention to provide a gauge conveniently usable for rapidly and accurately centering a cylindrical element beneath the rotary cutter of a milling machine.

Another object is to provide such a gauge readily applicable to cutters of various sizes and cylindrical elements of various sizes.

Still another object is to provide such a gauge having conveniently observable visual means for indicating when centering has been accomplished with the gauge.

A further object is to provide such a gauge of simple, light, compact, durable and inexpensive construction.

These and other objects and advantages of the invention will more fully appear from the following description made in connection with the accompanying drawing, wherein like reference characters refer to the same or similar parts throughout the views, and, in which:

Fig. 1 is a reduced scale front view of an embodiment of my invention operatively associated with a milling machine cutter and a cylindrical element to be operated on by said cutter;

Fig. 2 is a top view;

Fig. 3 is a partially broken-away, partially sectional front view;

Fig. 4 is a view taken on the line 4—4 of Fig. 3 as indicated by the arrows;

Fig. 5 is a partially broken-away front view of another form of my device drawn at reduced scale;

Fig. 6 is a top view drawn at reduced scale; and

Fig. 7 is a full scale sectional view taken along the line 7—7 of Fig. 5 as indicated by the arrows.

Referring to the drawing and particularly Figs. 1 to 4 inclusive, the embodiment of my invention shown includes a pair of preferably identical rods 8 of circular cross section. The medial portions of the rods 8 are contained within respective tubular elements or barrels 9 in co-axially and longitudinally shiftable relation thereto. The internal diameters of the barrels 9 are somewhat larger than the diameters of the rods 8. The lower ends 9a of the barrels 9 are closed except for being centrally apertured to closely and yet slidably accommodate the rods 8. The upper ends of the barrels 9 are provided with centrally apertured screw threaded plugs 10 screw threadedly carried therein. The apertured portions of the plugs 10 are of such diameter as to closely but yet slidably accommodate the rods 8. Each rod 8 is provided in its lower portion with a collar 11 secured thereon inwardly of the lower ends 9a of the barrels 9. Each rod 8 is provided with a helical spring 12 encircling the same within the barrels 9 and bearing at respective ends against the collar 11 and the screw plug 10. The springs 12 will obviously tend to urge the rods 8 downwardly to positions thereof wherein the collars 11 abut the lower ends 9a of the barrels 9. Yokes 13 of forked or bifurcated shape are mounted on the lower ends of the respective rods 8. The yokes 13 are provided with respective rollers 14 rotatably carried thereby by means of axle pins 15 mounted in apertured portions of the yokes 13 as shown.

The upper ends of the rods 8 are provided with respective blocks or heads 16 and 17, each of which is apertured to receive the upper end of one of the rods 8 and is split as at 16a and 17a to enable securing of the blocks 16 and 17 to the rods 8 in the manner of a clamp. The blocks 16 and 17 are provided with clamping screws 18 and 19 associated as shown therewith to clamp the blocks 16 and 17 on the respective rods 8. The block 16 carries thereon a flat finger 20 disposed in a vertical plane and extending past the upper end of the other one of the rods 8. The finger 20 is closely received and vertically movable in a horizontally disposed groove 17b formed in the block 17. The axle pins 15 previously described are disposed parallel to each other and are maintained in such parallel relation by means of the finger 20 cooperating with the grooved portion of the block 17.

The barrels 9 are interconnected in their respective medial portions by means of a structure 21 similar to a pair of outside calipers and including respective arms 21a swingably associated with each other by means of a fulcrum pin 21b and an arcuate spring 21c. The pair of arms 21a are provided with an adjusting screw 21d and thumb nut 21e in the manner of an ordinary pair of calipers so that the adjusting thumb nut 21e may be operated to vary the spacing between the barrels 9 while maintaining the barrels 9 and the rods 8 therewithin in parallel relation with each other. It is to be noted that the axle pins 15 are maintained parallel to each other through cooperation of the finger 20 with the grooved block 17 during variation in the spacing between the barrels 9.

The manner of use of the above described centering gauge is illustrated in Fig. 1 wherein the gauge is shown in operative relation with a milling machine cutter 22 and a cylindrical element 23 wherein a keyway 23a is to be cut as indicated in dotted lines. The barrels 9 of my device are brought into engagement with the respective radially disposed sides or faces of the cutter 22 by adjusting the thumb nut 21e. The entire device is then shifted downwardly to a point whereat the rollers 14 are in engagement with the periphery of the cylindrical element 23 and wherein the springs 12 have been somewhat compressed by upward movement of the rods 8 relative to the barrels 9. The cylindrical element 23 is then shifted to the right or left as required to bring the rollers 14 into a common plane normal to a line extending radially of the cutter 22 to the axis of the cylindrical element 23. Attainment of this position is indicated by the upper edge of the finger 20 reaching a level relative to the grooved block 17 whereat said upper edge of the finger 20 is flush with the top surface of the block 17. The device is, of course, originally constructed so that the flush relation of the finger 20 and block 17 occurs when the rollers 14 are in a common plane normal to the longitudial axes of the rods 8. When the rollers 14 have become positioned as above described it is true that the points of engagement between the respective rollers 14 and the periphery of the cylindrical element 23 are at equal angles away from a vertical plane 23b containing the axis of the cylindrical element 23. The plane 23 is then positioned midway between the rollers 14 and accordingly is vertically aligned with a vertical plane midway between the radially disposed faces of the cutter 22.

Referring to Figs. 5 to 7 inclusive, I have illustrated another form of my device of more simple and less expensive construction than the above described form but yet operating in accordance with identically the same principle. The form of the device illustrated in Figs. 5 to 7 includes a pair of parallel substantially identical rods 24 preferably of circular cross section. The rods 24 are interconnected at corresponding points in their medial portions by means of a generally U-shaped member 25 formed of flat resilient material. The member 25 is disposed substantially in a plane normal to the longitudinal axes of the rods 24 as shown. The free ends of the respective arms 25a of the member 25 are connected by means of nutted bolts 26 to brackets 27 which are in turn secured to the rods 24 by suitable means such as the screws 28. The brackets 27 are each formed of a double thickness of sheet material between the layers of which the upper ends of the arms 25a are interposed. The bolts 26 are normally in tightened condition with the member 25 disposed as shown in the drawing. However, for purposes of compacting the device for purposes of shipment or storage the bolts 26 may be loosened and the member 25 swung downwardly into closely spaced relation with the rods 24. Because of the resiliency of the member 25 the rods 24 may be variously spaced for engagement of the same with respective faces of rotary cutters of different sizes. Also due to resiliency of the member 25 the rods 24 are longitudinally movable relative to each other within limits.

The upper end of one of the rods 24 has formed thereon a lug 29 extending radially therefrom in a direction opposite the direction therefrom wherein the remaining rod 24 is disposed. A flat finger 30 is placed upon the lug 29 and is attached thereto for swinging movement in a horizontal plane by means of a pivot screw 31 extending through a suitably apertured portion of the finger 30 and screw threadedly engaged in an internally screw threaded apertured portion of the lug 29. Means is provided to maintain the lower face of the finger 30 in contact with the upper face of the lug 29. For this purpose a flat spring 32 which is apertured at both ends thereof is associated with the finger 30 with the pivot screw 31 extending through one apertured end of the spring 32. The remaining apertured end of the spring 32 is secured to the medial portion of the finger 30 by suitable means such as a screw 33. The upper face of the lug 29 is flush with the upper end of the right-hand rod 24 and accordingly the lower face of the finger 30 is also flush with the upper end of the right-hand rod 24. Since the finger 30 is swingable the same may be positioned with its free end portion closely adjacent the upper end of the left-hand rod 24 as indicated in Fig. 6. Arrival of the lower face of the finger 30 in alignment with the upper end of the left-hand rod 24 in a horizontal plane indicates that the lower end faces of the respective rods 24 are disposed in a common plane. The device is used in a manner similar to that in which the device of Fig. 1 is used. The rods 24 are placed in engagement with respective faces of a rotary cutter such as the cutter 22, and the lower ends of the rods 24 are placed in engagement with the periphery of a cylindrical element such as the element 23 which is to be centered with respect to the cutter 22. The cylindrical element 23 may be adjustively moved to the right or left as required until the lower face of the finger 30 is horizontally aligned with the upper end of the left-hand rod 24. When this position has been attained, the lower ends of the rod 24 have become disposed in a common plane normal to a line extending radially from the cutter 22 to the axis of the element 23, and accordingly the vertical plane 23b containing the axis of the cylindrical element 23 is verticaly aligned with the central plane of the cutter 22.

Portions of the respective rods 24 have been removed as at 24a to enable bringing of the device closer than otherwise possible to a shaft on which a cutter such as the cutter 22 is carried.

While embodiments of my invention have been illustrated and described as for use in connection with centering of work relative to the rotary cutter of a milling machine, it is apparent that the device may be readily adapted for use in centering operations elsewhere than in connection with milling machines.

It is apparent that I have invented a novel, simple, compact, and inexpensive centering gauge adapted for convenient and rapid use to accurately center cylindrical elements with respect to central planes of rotary elements.

Both of the embodiments of my invention described above have been constructed and used in daily service in a machine shop, and have been found to be very effective and capable of manipulation to attain very rapid and very accurate centering.

It will, of course, be understood that various changes may be made in the form, details, arrangement, and proportions of the various parts without departing from the scope of my invention.

What is claimed is:

1. A centering device for use in placing the axis of a cylindrical element in a plane extending parallel to and midway between the respective radially disposed faces of a rotary cutter comprising, a pair of parallel, elongated members adapted to be placed adjacent said respective faces in parallel relation therewith, means interconnecting said members to permit longitudinal movement of one thereof relative to the other, said elongated members being adapted at one end of the pair thereof for engagement with the periphery of said cylindrical element, and an indicating element carried by one of said members and co-acting with a portion of the other of said members to indicate when said periphery-engaging ends of the respective members have become situated in a common plane normal to a line extending radially of said cutter to said axis.

2. A centering device for use in placing the axis of a cylindrical element in a plane midway between and parallel to the respective radial faces of a rotary cutter comprising, a pair of parallel, elongated members adapted to be maintained in their medial portions adjacent said respective faces in parallel relation therewith and to be maintained at their respective corresponding ends, in engagement with the periphery of said cylindrical element, and means interconnecting said members including a pair of arms swingably connected together and connected at their free ends to said respective members, said interconnecting means being resilient in portions thereof to enable longitudinal movement of one of said members relative to the other.

3. A centering device for use in placing the axis of a cylindrical element in a plane extending parallel to and midway between the respective radially disposed faces of a rotary cutter comprising, a pair of parallel elongated members, a pair of elongated barrels through which said respective elongated members extend in co-axial, longitudinal shiftable relation with the respective ones thereof, said barrels being adapted to be maintained against said respective faces while corresponding ends of said respective members are maintained in engagement with the periphery of said cylindrical element whereby arrival of said ends in a common plane normal to a line extending radially from said cutter to said axis indicates that said axis has become disposed in said first-mentioned plane, and means interconnecting said barrels arranged to permit adjustive variation in the distance therebetween.

4. The structure defined in claim 3 and means yieldably urging said members toward the periphery-engaging ends thereof relative to said respective barrels.

5. A centering device for use in placing the axis of a cylindrical element in a plane extending parallel to and midway between the respective radially disposed faces of a rotary cutter comprising, a pair of parallel elongated members, a pair of elongated barrels through which said respective elongated members extend in co-axial, longitudinally shiftable relation with the respective ones thereof, a pair of arms swingably interconnected and attached at their free ends to said respective barrels, circular elements mounted on corresponding ends of said respective members for rotation on respective parallel axes normal to the axes of the respective members, said barrels being adapted to be maintained against said respective faces while said circular elements are maintained in engagement with the periphery of said cylindrical element, an indicating finger extending radially from the remaining end of one of said members closely past the remaining end of the other of said members, a body carried on said last mentioned remaining end and having a notch therein wherein the free end of said finger is disposed for movement relative thereto longitudinally of said members whereby the rotational axes of said circular elements will be maintained parallel and a predetermined position of said finger relative to said body will indicate attainment by the axes of said circular elements of positions in a common plane normal to a line extending radially from said cutter to the axis of said cylindrical element.

6. A centering device for use in placing the axis of a cylindrical element in a plane extending parallel to and midway between the respective radially disposed faces of a rotary cutter comprising, a pair of parallel elongated members movable longitudinally relative to each other and adapted to be maintained adjacent said respective faces in parallel relation therewith while corresponding ends of the respective members are maintained in engagement with the periphery of said cylindrical element, and a generally U-shaped element disposed substantially in a plane normal to said members and attached at its free ends to said respective members for interconnecting the same, said U-shaped element being resilient to permit longitudinal movement of one of said members relative to the other, and adjustive variation in the distance between said members.

7. A device for centering a cylindrical element relative to a rotary cutter comprising, a pair of elongated members and means so interconnecting said members as to tend to maintain the same in parallel relation while permitting longitudinal movement of one thereof relative to the other, portions of said members being arranged to facilitate maintenance thereof adjacent and parallel to the respective radially disposed faces of a rotary cutter while corresponding ends of the respective members are coincidentally maintained in engagement with the periphery of a cylindrical element having an axis parallel to a plane midway between said faces whereby alignment of said ends in a direction normal to said plane will indicate disposition of said axis in said plane.

8. The structure defined in claim 7 and said interconnecting means including respective portions shiftable relative to each other to enable adjustive variation in the spacing between said members.

9. The structure defined in claim 7 and said interconnecting means including respective portions shiftable relative to each other to enable adjustive variation in the spacing between said members within limits, and a portion of said means being resilient to yieldingly urge said members toward positions thereof corresponding to one of said limits.

10. The structure defined in claim 7 and, said interconnecting means including respective portions shiftable relative to each other, and a portion of said means being resilient to yieldingly urge said members toward each other.

11. The structure defined in claim 7 and resilient means incorporated in said interconnecting means to yieldingly oppose said longitudinal movement.

12. The structure defined in claim 7 and said interconnecting means being resilient at least in parts thereof to yieldingly urge said members toward each other and yieldingly oppose said longitudinal movement.

HENRY J. WEPPLO.